(12) United States Patent
Rode

(10) Patent No.: US 8,893,364 B2
(45) Date of Patent: Nov. 25, 2014

(54) SETTING OF WHEEL HUB ASSEMBLY HAVING A SPACER THEREIN

(71) Applicant: John E. Rode, Fonda, NY (US)

(72) Inventor: John E. Rode, Fonda, NY (US)

( * ) Notice: Subject to any disclaimer, the term of this patent is extended or adjusted under 35 U.S.C. 154(b) by 0 days.

(21) Appl. No.: 13/719,569

(22) Filed: Dec. 19, 2012

(65) Prior Publication Data

US 2013/0219681 A1 Aug. 29, 2013

Related U.S. Application Data

(60) Provisional application No. 61/602,448, filed on Feb. 23, 2012.

(51) Int. Cl.
*B23Q 17/00* (2006.01)
*B60B 27/00* (2006.01)
*B23P 11/00* (2006.01)
*B60B 29/00* (2006.01)

(52) U.S. Cl.
CPC .............. *B23P 11/00* (2013.01); *B60B 27/00* (2013.01); *B60B 29/00* (2013.01)
USPC .................. 29/407.05; 29/407.1; 29/407.09; 73/862.23

(58) Field of Classification Search
USPC ......... 29/407.01, 407.05, 407.09, 407.1, 724, 29/898.09; 73/862.23, 865.9; 33/203.18, 33/517
See application file for complete search history.

(56) References Cited

U.S. PATENT DOCUMENTS

| 518,328 | A | 4/1894 | Oakey |
|---|---|---|---|
| 578,276 | A | 3/1897 | Strauss et al. |
| 578,576 | A | 3/1897 | Strauss et al. |
| 1,352,643 | A | 9/1920 | Young |

(Continued)

FOREIGN PATENT DOCUMENTS

| DE | 3905385 A1 | 8/1990 |
|---|---|---|
| EP | 1367299 A2 | 12/2003 |

(Continued)

OTHER PUBLICATIONS

Search Report for application GB0701360.0 recieved Mar. 22, 2007.

(Continued)

*Primary Examiner* — Essama Omgba
(74) *Attorney, Agent, or Firm* — Heslin Rothenberg Farley & Mesiti P.C.; Nicholas Mesiti, Esq.; Victor A. Cardona, Esq.

(57) ABSTRACT

A method for setting a wheel hub assembly having a spacer therein, mounted on an axle, shaft or spindle or includes a cap a shaft is disclosed. The method is used on a wheel hub assembly having a spacer and bearings therein mounted on the axle, shaft or spindle. A retaining nut on the wheel hub assembly is tightened to the manufacture's specified torque for a particular wheel hub assembly for securing said assembly together. The wheel hub of the hub assembly is rotated when the nut is torqued to set the bearings. The retaining nut is loosened after rotating and the endplay within the wheel hub assembly is measured using an endplay measuring tool. The torque on the retaining nut is then adjusted to obtain a desired endplay measurement for the wheel hub assembly. The resultant torque on the nut at the desired endplay measurement is different from the manufacturer specified torque for the wheel hub assembly.

21 Claims, 3 Drawing Sheets

(56) References Cited

U.S. PATENT DOCUMENTS

| | | | |
|---|---|---|---|
| 1,366,273 A | 1/1921 | Nettlefold | |
| 1,373,489 A | 4/1921 | Cochran | |
| 1,384,655 A | 7/1921 | Allmon | |
| 1,440,938 A | 1/1923 | Sieroslawski | |
| 1,755,807 A | 4/1930 | Boles | |
| 1,758,515 A | 5/1930 | Heiermann | |
| 2,301,786 A | 11/1942 | Millermaster | |
| 2,426,219 A | 8/1947 | Jackson | |
| 2,755,698 A | 7/1956 | Wurzel | |
| 2,769,360 A | 11/1956 | Woodford et al. | |
| 2,813,732 A | 11/1957 | Hird | |
| 3,144,909 A | 8/1964 | Hart et al. | |
| 3,241,409 A | 3/1966 | Raptis | |
| 3,308,546 A * | 3/1967 | Storch | 33/517 |
| 3,464,474 A | 9/1969 | Jansen | |
| 3,480,300 A | 11/1969 | Jeffrey et al. | |
| 3,581,609 A | 6/1971 | Greenwood | |
| 3,664,226 A | 5/1972 | Gonzalez | |
| 3,678,981 A | 7/1972 | Heyworth | |
| 3,742,568 A | 7/1973 | Hahlbeck | |
| 3,762,455 A | 10/1973 | Anderson, Jr. | |
| 3,844,323 A | 10/1974 | Anderson, Jr. | |
| 3,986,750 A | 10/1976 | Trent et al. | |
| 4,048,897 A | 9/1977 | Price, Jr. | |
| 4,054,999 A | 10/1977 | Harbottle | |
| 4,210,372 A | 7/1980 | McGee et al. | |
| 4,305,438 A | 12/1981 | Spinosa et al. | |
| 4,812,094 A | 3/1989 | Grube | |
| 4,958,941 A | 9/1990 | Imanari | |
| 4,971,501 A | 11/1990 | Chavez | |
| 5,011,306 A | 4/1991 | Martinie | |
| 5,058,424 A * | 10/1991 | O'Hara | 73/115.07 |
| 5,070,621 A * | 12/1991 | Butler et al. | 33/517 |
| 5,125,156 A * | 6/1992 | Witte | 29/898.09 |
| 5,129,156 A * | 7/1992 | Walker | 29/898.09 |
| 5,180,265 A | 1/1993 | Wiese | |
| 5,348,349 A | 9/1994 | Sloane | |
| 5,362,111 A | 11/1994 | Harbin | |
| 5,366,300 A | 11/1994 | Deane et al. | |
| 5,386,630 A * | 2/1995 | Fox | 29/898.09 |
| 5,533,849 A | 7/1996 | Burdick | |
| 5,535,517 A * | 7/1996 | Rode | 29/898.09 |
| 5,560,687 A * | 10/1996 | Hagelthorn | 301/105.1 |
| 5,597,058 A | 1/1997 | Ewer | |
| 5,877,433 A | 3/1999 | Matsuzaki et al. | |
| 5,882,044 A | 3/1999 | Sloane | |
| 6,058,767 A * | 5/2000 | Calvin | 73/115.06 |
| 6,065,920 A | 5/2000 | Becker et al. | |
| 6,186,032 B1 | 2/2001 | Raines | |
| 6,279,422 B1* | 8/2001 | Moll | 74/606 R |
| 6,286,374 B1 | 9/2001 | Kudo et al. | |
| 6,450,914 B1* | 9/2002 | Irwin et al. | 475/230 |
| 6,478,709 B1* | 11/2002 | Irwin et al. | 475/230 |
| 6,520,710 B2 | 2/2003 | Wells | |
| 6,598,500 B1 | 7/2003 | Chivington | |
| 6,618,924 B1* | 9/2003 | Irwin | 29/407.05 |
| 6,637,297 B1 | 10/2003 | Mlynarczyk | |
| 6,749,386 B2 | 6/2004 | Harris | |
| 6,857,665 B2 | 2/2005 | Vyse et al. | |
| 6,976,817 B1 | 12/2005 | Grainger | |
| 6,993,852 B2 | 2/2006 | Russell et al. | |
| 7,303,367 B2 | 12/2007 | Rode | |
| 7,343,836 B1 | 3/2008 | Ward | |
| 7,346,985 B1 | 3/2008 | Strait | |
| 7,389,579 B2* | 6/2008 | Rode | 29/724 |
| 7,428,779 B2* | 9/2008 | Smith et al. | 33/203.18 |
| 7,559,135 B2 | 7/2009 | Rode | |
| 8,316,530 B2 | 11/2012 | Rode | |
| 8,359,733 B2* | 1/2013 | Rode | 29/724 |
| 8,359,936 B2* | 1/2013 | Rode | 73/862.49 |
| 8,397,589 B2* | 3/2013 | Rode | 73/862.23 |
| 8,474,330 B1* | 7/2013 | Rode | 73/862.23 |
| 8,490,524 B2 | 7/2013 | Rode | |
| 8,534,140 B2* | 9/2013 | Rode | 73/862.23 |
| 8,539,842 B2* | 9/2013 | Rode | 73/862.49 |
| 8,689,445 B2* | 4/2014 | White et al. | 29/894.321 |
| 2002/0059736 A1* | 5/2002 | Vencill | 33/832 |
| 2002/0110414 A1 | 8/2002 | Wells | |
| 2003/0035699 A1 | 2/2003 | Harris | |
| 2004/0086354 A1 | 5/2004 | Harris | |
| 2004/0089113 A1 | 5/2004 | Morgan | |
| 2005/0025604 A1 | 2/2005 | Slesinski et al. | |
| 2005/0207865 A1 | 9/2005 | Disantis et al. | |
| 2006/0008340 A1 | 1/2006 | Cox | |
| 2007/0052287 A1* | 3/2007 | White et al. | 301/132 |
| 2007/0177829 A1 | 8/2007 | Rode | |
| 2007/0211973 A1 | 9/2007 | Rode | |
| 2007/0286699 A1 | 12/2007 | Rode | |
| 2007/0294900 A1* | 12/2007 | Smith et al. | 33/203.18 |
| 2009/0255386 A1 | 10/2009 | Liao | |
| 2010/0166353 A1* | 7/2010 | Rode | 384/540 |
| 2010/0326205 A1 | 12/2010 | Rode | |
| 2012/0066879 A1* | 3/2012 | Daeschner | 29/407.05 |
| 2012/0079892 A1* | 4/2012 | Rode | 73/862.23 |
| 2012/0079893 A1* | 4/2012 | Rode | 73/862.23 |
| 2012/0079922 A1* | 4/2012 | Rode | 81/462 |
| 2012/0115673 A1* | 5/2012 | Deans | 475/331 |
| 2012/0246955 A1* | 10/2012 | Smith | 33/517 |
| 2013/0145864 A1* | 6/2013 | Rode | 73/862.23 |
| 2013/0160566 A1* | 6/2013 | Rode | 73/862.23 |

FOREIGN PATENT DOCUMENTS

| | | |
|---|---|---|
| GB | 2286231 A | 8/1995 |
| GB | 2434621 B | 8/2007 |
| GB | 2435499 B | 8/2007 |

OTHER PUBLICATIONS

Examiner's Report for application AU2007200331 received Mar. 19, 2007.

"STEMCO Pro-Torq (R) Advanced Axle Spindle Nuts 09-571-0006," Instruction guide, Copyright Aug. 2003, 2 pages.

"STEMCO Pro-Torq(R) 571-2970," Copyright 2005 STEMCO LP, 2 pages.

"Timkin Products-Bearings," vol. One, Issue 6; 2 pages, [http://www.timken.com/products/bearings/techtips/tip6.asp].

Timken Tech Tips: Promoting Safe, Proper Bearing Handling Practices for the Heavy-Duty Market; "Preload in Wheel Bearings" vol. 6, Issue 3, 2 pages, [http://www.Timken.com/products/bearings/techtipsPFDs/Vol6No3.pdf#search='Bearing%20Preload].

"Forming and Shaping Processes Compaction and Sintering (Pulvepresning)," Copyright Institute for Precesteknik Danmarks Tekniske Universitet 1996. (http://www.ipt.dtu.dk/ ap/ingpro/fprming/ppm/htm).

STEMCO, Pro-Torq. An Axle Spindle Nut System for Today's Fleets, Mar. 2003; download from http://www.stemco.com, pp. 38-41.

STEMCO, Pro-Torq. An Axle Spindle Nut System for Today's Fleets. Mar. 2003; download from http://www.stemco.com, pp. 57-64.

What is Powder Metallurgy? Dec. 2004, 2 pages. (https://www.mpif org/technology/whatis.html).

STEMCO, Quick Reference Catalog 572-0011 Rev, Apr. 2010; revised Apr. 2010; downloaded from http://www.stemco.com/wp-content/uploads/2011/12/STEMCOQRWebd.pdf.

STEMCO, Wheel End Products Catalog 574-0140, Revised Oct. 2010; dowloaded from http://www.stemco.com/wp-content/uploads/2011/12/StemcoWheelSeal.pdf.

GB Intellectual Property Office Search Report Under Section 17, dated Aug. 25, 2010, from GB Application No. 1008927.4.

Jul. 6, 2011 Office Action in U.S. Appl. No. 13/019,583.

Oct. 28, 2011 Office Action in U.S. Appl. No. 13/019,583.

Apr. 9, 2012 Non-Final Office Action in U.S. Appl. No. 13/019,583.

Aug. 29, 2012 Final Office Action in U.S. Appl. No. 13/019,583.

"Lock Nut System", Rode, U.S. Appl. No. 11/029,531, filed Jan. 5, 2005. 17 pages.

Consolidated Metco, Inc. Preset Plus hub install procedures, Part No. 10036676, Copyright 2011.

(56) References Cited

OTHER PUBLICATIONS

"Understanding the Impact of Wide Base Single Tines on Axle and Wheel-End Systems", Meritor White Papers, Oct. 2011.
Oct. 28, 2008 Office Action in U.S. Appl. No. 11/341,948.
Mar. 11, 2009 Notice of Allowance in U.S. Appl. No. 11/341,948.
Mar. 6, 2008 Notice of Allowance in U.S. Appl. No. 11/354,513.
Oct. 12, 2010 Office Action in U.S. Appl. No. 12/942,826.
Feb. 4, 2011 Office Action in U.S. Appl. No. 12/492,826.
May 20, 2011 Office Action in U.S. Appl. No. 12/492,826.
Sep. 7, 2011 Office Action in U.S. Appl. No. 12/492,826.

\* cited by examiner

SETTING OF WHEEL HUB ASSEMBLY HAVING A SPACER THEREIN

CROSS-REFERENCE TO RELATED APPLICATIONS

This application is a Non-Provisional of U.S. Provisional Application No. 61/602,448 filed on Feb. 23, 2012, and titled "Setting of Wheel Hub Assembly Having a Spacer Therein".

This application relates to U.S. application Ser. No. 13/400,227, filed Feb. 20, 2012, titled "Systems and Methods for Measuring Bearing Endplay", U.S. application Ser. No 13/091,890, filed Apr. 21, 2011, titled "Systems and Methods for Measuring Bearing Endplay", U.S. application Ser. No. 13/019,583, filed Feb. 2, 2011, titled "Systems and Methods for Adjusting Bearing Endplay", U.S. application Ser. No. 12/951,727, filed Nov. 22, 2010, titled "Systems and Methods for Measuring Bearing Endplay", U.S. application Ser. No. 12/492,826, filed Jun. 26, 2009, titled "Systems And Methods For Preloading A Bearing And Aligning A Lock Nut", issued as U.S. Pat. No. 8,316,530 on Nov. 27, 2012, U.S. application Ser. No. 11/341,948, filed Jan. 27, 2006, and titled "Method And Apparatus For Preloading A Bearing," issued as U.S. Pat. No. 7,559,135 on Jul. 14, 2009, U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, and U.S. Provisional Application No. 61/388,806, filed Oct. 1, 2010, and titled "Systems and Methods for Preloading a Bearing and Aligning Lock Nut", each of which is incorporated herein by reference.

TECHNICAL FIELD

The present invention relates, generally, to methods and apparatus for setting antifriction bearings for spacered wheel hub assemblies and in drive trains, and adjusting bearings to ensure the correct preload and desired endplay is applied to the bearings.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.002 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems using a single nut are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft. After the nut is torqued to its specified amount, the nut is locked to this specified position.

In one example, a user may tighten a nut bolding a bearing on a shaft to a particular torque to achieve the desired preload on the bearing of the wheel hub assembly and then such nut may be loosened to a particular position by referencing an index mark on a face of the nut a particular distance. Such a nut could be turned a particular portion of a rotation by referencing such a marking, e.g., half a turn. Such an adjustment is a particularly inexact procedure given that wheel nut adjustment is desired to have precision of 0.001 of an inch while the degree of rotation of a nut as described is relatively inexact. The loosening of the nut will create an endplay in the bearing and the wheel hub assembly. The amount of endplay depends upon the particular bearing and wheel hub assembly.

Some wheel hub assemblies utilize a spacer located between two bearings mounted on, for example, a spindle of a truck. In such wheel hub assemblies, an inner bearing and outer bearing are mounted on the spindle With such a spacer located therebetween. At least one such wheel hub assembly is utilized by Consolidated Metco, Inc. of Vancouver, Wash., U.S.A. In such assembly, the wheel hub retaining nut which secures the wheel hub assembly is specified by the manufacturer to be torqued to a specified setting. See, Consolidated Metco. Inc. Preset Plus hub install procedures, Part No. 10036676, Copyright 2011. For example, 300 foot pounds for a steer hub and 500 foot pounds for a drive hub or trailer hub. Application of such a torque, as specified by the manufacturer, provides a compressive load on the spacer, e.g., a preload. However, the manufacturer specified torque applied to the retaining nut will often result in an undesireable endplay, for example, one which will reduce the effective life of the wheel bearings. Moreover, in a situation where a spacer other than the OEM specified spacer is used or when a spacer is made to inexact tolerances, the resultant endplay may be undesireable. The manufacturer's desired torque for a retaining nut may typically result in an endplay setting which could vary up to 0.006 inches for the same type spacer due to manufacturing tolerances. Such variance is undesireable because it may lead to premature bearing failure in many beatings.

Thus, a need exists for setting wheel hub assemblies having a spacer therein, for obtaining a desired endplay and increasing bearing wheel life in such assemblies, and for providing more accurate and repeatable procedures for setting and adjusting such wheel hub assemblies.

SUMMARY OF THE INVENTION

Excessive endplay may result in premature failure of the wheel hub assembly and bearings therein. Recent studies have indicated that a wheel hub endplay of 0.005 inches will reduce the life of bearings and a wheel hub assembly by 40% of its baseline. See *Understanding The Impact of Wide Base Single Tines on Axle and Wheel-End System*, Mentor White Papers, October, 2011. Moreover, too little endplay, which could result from excessively preloading the bearing and torquing the retaining nut, will also lead to premature bearing failure. However, such an undesireable endplay will often result when the retaining nut of a spacered wheel hub assembly is set to the manufacturer's specified torque.

The invention herein may be used to improve the endplay of a wheel hub assembly having a spacer, including adjustable spacers, therein. By utilizing an endplay measuring tool during such a wheel hub assembly and bearing setting to measure and set endplay at a desired amount, such as 0.001 inches, adjustment of the torque on the retaining nut will be at a level different than the manufacturer's specified level. However, wheel bearing life would be improved.

The present invention provides, in a first aspect, a method of setting a wheel hub assembly having a spacer therein on a shaft, axle or spindle. The method includes accessing a wheel hub assembly having a spacer and at least one bearing mounted on a shaft, axle or spindle. A retaining nut is installed on the wheel hub assembly to a specified torque. The retaining nut secures the assembly together and a compressive load is applied to the spacer and at least one bearing. The wheel hub of the wheel hub assembly is rotated to set the at least one bearing. The torque on the retaining nut is reduced after rotating the wheel hub. An endplay measuring tool is used to measure the endplay within the wheel hub assembly and the torque on the retaining nut is adjusted to obtain a desired endplay measurement within the wheel hub assembly. The resultant torque on the retaining nut is different from the manufacturer's specified torque for the wheel hub assembly.

The method may be used in assembling wheel hubs having a spacer therein during manufacture, repair or rebuild of the same. The desired endplay measurement should be less than 0.005 inches, preferably less than 0.004 inches, more preferably less than 0.003 inches, and even more preferably less than 0.002 inches. The most preferred desired endplay measurement achieved in accordance with the present invention is about 0.001 inches. Technically, preloads of up to 0.002 each of compressive deflection will achieve better life than minimal readable endplay settings. However such corresponding adjustments cannot be verified using an endplay measurement tools. Thus, desired endplay settings of less than 0.001 inches are useable with the present invention.

The wheel hub assembly may include two bearings with the spacer located therebetween. The spacer of such a wheel hub assembly may also include an adjustable spacer. The resultant torque on the wheel hub assembly achieved in accordance with the present invention may be greater than the manufacturer's specified torque, or less than the manufacturer's specified torque. The method may be performed with a wheel mounted on the wheel hub assembly and an endplay measuring tool mounted over the wheel. The retaining nut may comprise a lock nut which may be locked after the desired endplay measurement is achieved. The retaining nut may be rotated to adjust the torque and/or endplay while the endplay measuring tool is connected to the wheel hub assembly. The endplay measuring tool may be connected to the wheel lugs of the wheel hub of the wheel hub assembly. The endplay measuring tool may be manually operated. The method may be used with original equipment manufactured spacers in the wheel hub assembly, or after-market spacers.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, methods and techniques for setting a wheel hub assembly having a spacer and mounted on a shaft, axle or spindle are provided.

Figure 1:
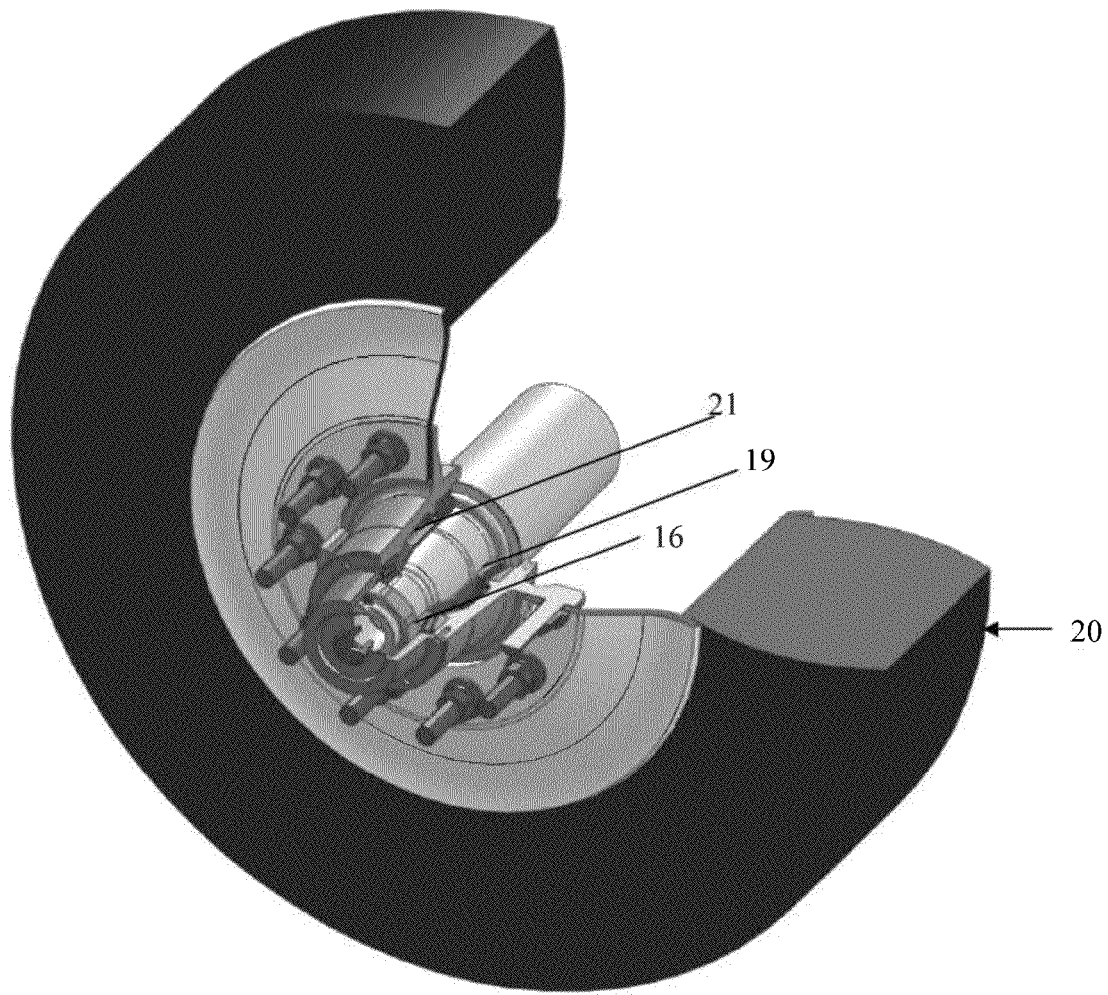
FIG. 1 is a perspective sectional view of a wheel hub assembly haying a spacer therein mounted on a shaft or spindle, with a wheel attached, for implementation of setting in accordance with the present invention.
Figure 2:
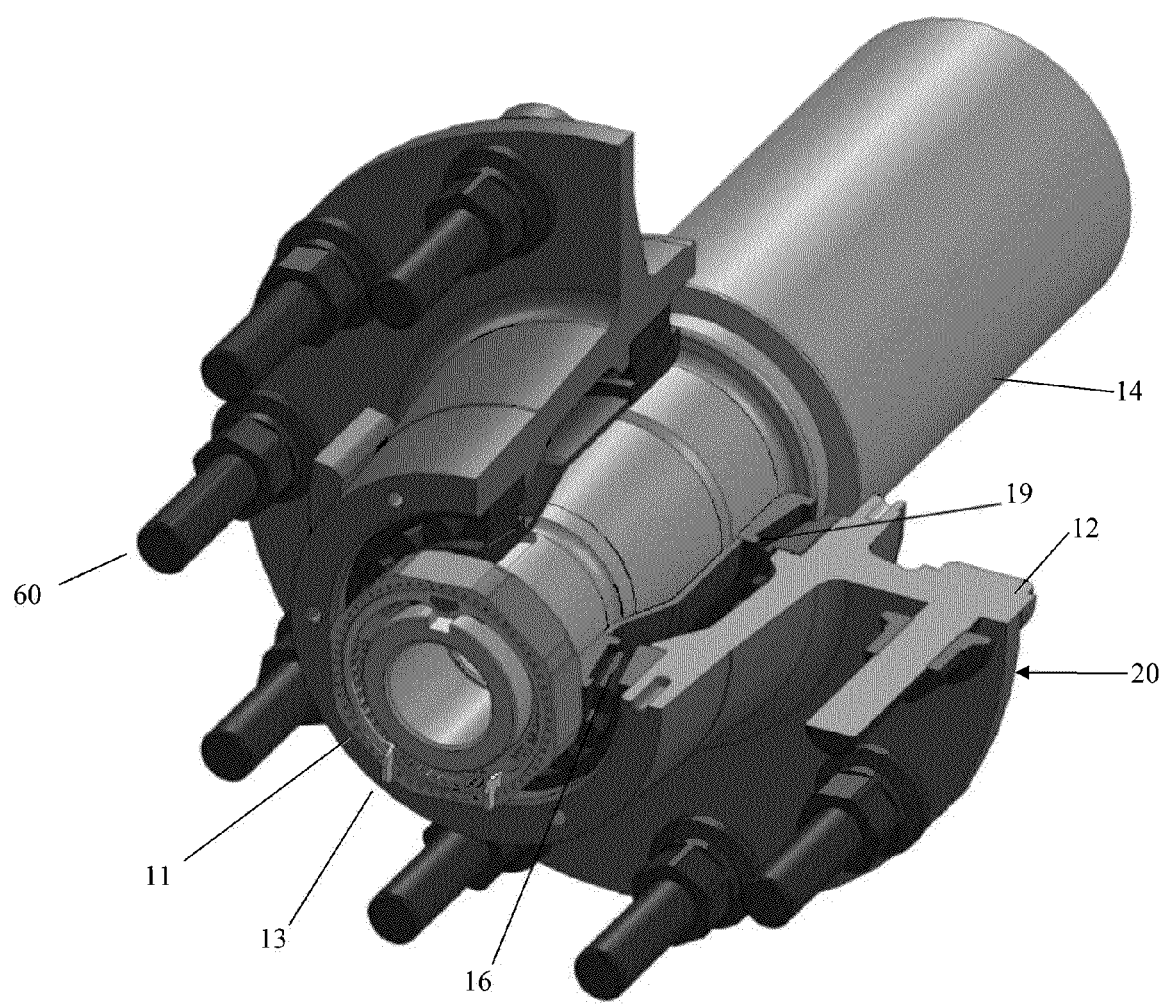
FIG. 2 is a perspective sectional view of the wheel of FIG. 1 without the wheel thereon.

A spacered wheel hub assembly 20, as shown in FIGS. 1 and 2, is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, the method may be used in these and any other spacer assembly for which bearing preload and/or endplay is desired, for example, any assembly that utilizes thrust and radial load carrying bearings that are indirectly mounted.

Figure 3:
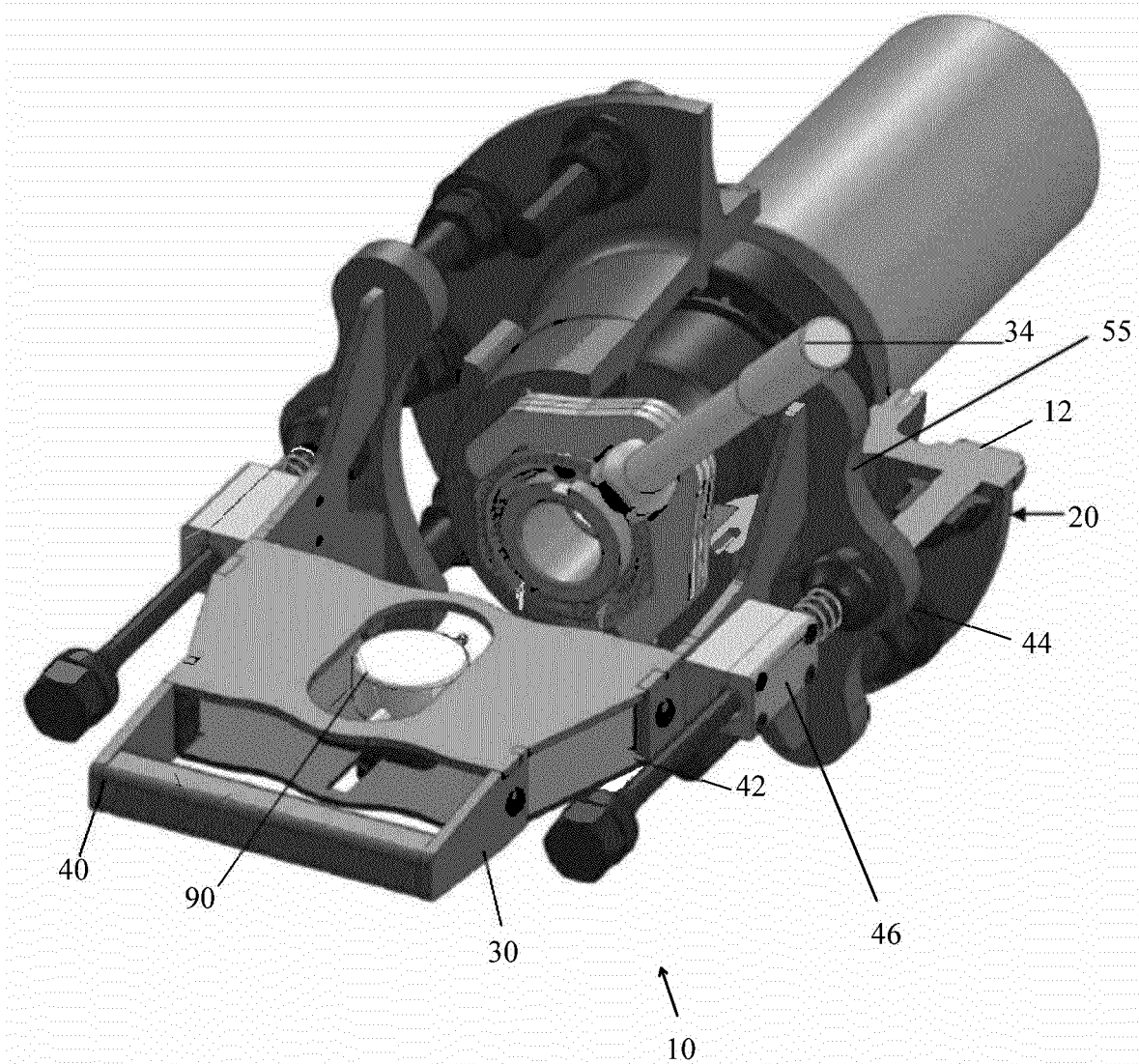
FIG. 3 is a perspective sectional view of the endplay measuring tool and retaining nut adjustment wrench mounted on the wheel hub of FIGS. 1 and 2 useable to set the bearings within the wheel hub assembly and measure endplay.

As shown in FIGS. 1-3, for example, wheel hub assembly 20 includes a wheel hub or, simply, a hub 12, a threaded spindle, axle, or a shaft (hereinafter "spindle") 14. As is typical, spindle 14 is mounted with two antifriction bearings 16, 19, a spacer 21 therebetween, and spindle 14 includes an exposed end 13, which is typically threaded on the outside diameter and is partially hollow at the end. A retaining nut 11 (FIG. 2) may be threaded to exposed end 13 to retain hub 12 thereon.

As shown in FIGS. 2 and 3, as is typical of bearings, outboard bearing 16 includes an inner race (or cone) an outer race (or cup) a plurality of rollers 22, and a roller cage (not shown). Similarly, an inboard bearing 19 includes an inner race (or cone), an outer race (or cup), a plurality of rollers, and roller cage. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Publication No. 2007/0177829A1, published Aug. 2, 2007, (application Ser. No. 11/341,948 filed Jan. 27, 2006), entitled "Method and Apparatus for Preloading Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 5-8 of co-owned U.S. Provisional Application No. 61/388,806, filed Oct. 1, 2010, entitled "Systems and Methods for Preloading a Bearing and Aligning Lock Nut", for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Publication No. 2007/0177829A1 (application Ser. No. 11/341,948 filed Jan. 27, 2006), entitled "Method and Apparatus for Preloading Bearing"; and U.S. Pat. No. 7,389,579 (application Ser. No. 11/354,513, filed Feb. 15, 2006), entitled "Method, Apparatus, and Nut for Preloading a Bearing". In another example, a retaining nut could be a locking nut as disclosed in U.S. Pat. No. 3,762,455 to Anderson Jr. In the conventional art, retaining nut 11 typically is used to secure a wheel or hub assembly to non-rotating axle or spindle 14. However, in aspects of the present invention, retaining nut 11 may be useful in varying the preload and/or endplay of bearing 16 and 19. Bearing 16 may be a tapered roller bearing, or aspects of the invention may be applied to other types of antifriction bearings for which it is desirable to provide preload and/or endplay, for example, spherical roller bearings, deep groove ball bearings, and the like.

When installing and/or assembling the spaced wheel hub assembly, the manufacturer typically specifies that the retaining nut be adjusted to a specified torque. For example, Consolidated Metco, Inc., of Vancouver, Wash., specifies its Pre-Set Plus.™. wheel hub assembly. The retaining nut 11 is typically a locking type of nut which is locked into its final position upon completion of the bearing setting procedure. The retaining nut 11 is torqued to its manufacturer's specification to be torqued to 500 foot pounds for a drive or trailer hub assembly, and 300 foot pounds for a steer hub. This specification is set forth in Consolidated Metco. Inc. PreSet Plus.™. hub install procedures, Part No. 10036676, copyright 2011. The spindle nut in a steer hub is specified to be torqued for 300 foot pounds, and drive hub or trailer hub assemblies retaining nuts are torqued to about 500 foot pounds. Moreover, the hub is rotated at this specified torque and/or during the tightening of the nut 11. After retaining nut 11 is tightened on the spindle to a particular predetermined torque (e.g., using a torque wrench), the standard procedures call for locking the retaining nut 11 into place. At this point, the spaced wheel hub assembly is set as specified by the manufacturer.

In accordance with the present invention, the setting of such a spaced wheel hub assembly requires further steps to result in a desired endplay of the wheel hub assembly. Thus, an endplay adjustment procedure is required to obtain an endplay less than 0.005 inches, 0.004 inches, 0.003 inches, 0.002 inches, and/or about 0.001. And, preferably an endplay of 0.001 inches is obtained in accordance with this invention. However, such resultant endplays will result, typically, in a final torque on the hub assembly which is different than the manufacturer's specified torque. The resultant torque will typically be more than, but may also be less than the manufacturer's specified torque. The resultant torque difference will depend upon the various factors including spacer 21. Deformation of the spacer, as well as manufacturing tolerances will affect the resultant torque. Moreover, with the present invention, spacers other than manufacturer's specified spacers, may be used as replacements in the wheel hub assembly 20. Such adjustment procedures require that said endplay be measured with, for example, a dial indicator to assure a safe adjustment had been achieved. An endplay measuring tool as disclosed in U.S. patent application Ser. No. 13/400,227 filed on Feb. 20, 2012 and entitled "Systems and Methods for Measuring Bearing Endplay", which is incorporated by reference in its entirety, may be used to measure the endplay in a wheel hub assembly and the bearings therein, in accordance with the invention.

To set a spaced wheel hub assembly in accordance with invention, access to a wheel hub assembly must occur. The wheel hub assembly may be accessed when the wheel hub assembly is initially assembled by the manufacturer, reassembled at any time, or repaired. For example, when the wheel hub assembly is initially assembled or re-assembled such as, for example, during a repair procedure, inboard bearing 19 is placed on the axle or spindle. Spacer 21 is thereafter placed on the axle or spindle and outboard spacer 16 is then placed on the axle or spindle. Accordingly, spacer 21 will be coaxially located on the axle or spindle between outboard hearing 16 and inboard bearing 19. Wheel hub 12 is then coaxially mounted over the bearings and spacer. Retaining nut 11 is then threaded onto the exposed end of the axle or spindle and typically hand tightened to its desired amount. The aforementioned steps may be performed by also mounting the wheel on the wheel hub or with the wheel previously mounted on the wheel hub prior to placing the wheel hub over the bearings and spacer.

The retaining nut 11 is then torqued on the wheel hub assembly to the manufacturer's specified torque, as previously described herein. For example, 300 foot pounds or 500 foot pounds depending on the type of wheel hub assembly. The torqueing of the retaining nut secures the wheel hub assembly together and places an axially compressive load on the spacer 21 and bearings 16, 19, affectively placing the desired preload on the bearings. The wheel hub is then rotated at the aforementioned torque to set the bearings 16, 19. Typically, at least three rotations of the wheel hub assembly are required to assure proper roller alignment within the tapered roller bearing cages. After rotation of the wheel hub, the nut is then loosened to an amount less than the manufacturer's specified torque. Preferably, the retaining nut is loosened to a point near hand tightening. The retaining nut is preferably slightly looser than hand tightened. The endplay measuring tool is now used to measure the endplay within the wheel hub assembly 20. As described in more detail below, the endplay measuring tool 30, as shown in FIG. 3, is attached to the wheel hub assembly by threading the same onto the wheel lugs 60 of the wheel hub. Again, the wheel may, or may not, be also mounted on the wheel hub 12. The endplay measuring tool 30 is used to measure the endplay within the wheel hub assembly by reading an endplay measurement displayed by the tool. The process for obtaining an endplay measurement using the endplay measuring tool 30 is described in more detail below.

After the endplay measurement is obtained, the retaining nut 11 is adjusted to either reduce or increase the endplay as desired. Typically, an endplay of 0.001 inches is preferred and will result in maximum wheel bearing life. However, endplays of 0.005 inches or less may also be used as the desired resultant endplay measurement. If the endplay must be reduced, the retaining nut 11 is torqued some amount and the endplay measurement tool is used again to obtain a new endplay measurement. In other words, the endplay measurement step is repeated. If the new endplay measurement is not the desired amount, e.g., 0.001 inches, the retaining nut 11 may again be adjusted, either by tightening to further reduce endplay or by loosening to increase endplay. After this readjustment, a further endplay measurement is obtained, again as described in detail below. The endplay measurement steps and retaining nut adjustment steps are repeated until a desired endplay measurement and thus a desired endplay are achieved. After the desired endplay is achieved, the retaining nut is locked and the final setting of the wheel hub assembly is achieved. The endplay measurements taken, either the initial endplay measurements or subsequent endplay measurements, may result in an endplay which is either too tight or too loose. Thus, subsequent retaining nut adjustment will be dictated on whether the endplay measurement requires an increase and therefore a loosening of the nut, or a decrease and therefore a tightening of the nut.

The aforementioned process may also be used in wheel hub assemblies having adjustable spacers thereon, i.e., spacers which plastically deform after a specified axial preload is placed thereon. The process may also be performed with a wheel mounted on the wheel hub assembly and the endplay measuring tool mounted over the wheel. The retaining nut may be rotated to adjust the torque and/or endplay while the endplay measuring tool is connected to the wheel hub assembly, as is shown in FIG. 3, may be used to adjust the retaining nut 11 while the endplay measurement tool 10 is mounted on the wheel hub 12 either with or without a wheel thereon. The endplay measuring tool is typically manually operated. Moreover, the process may be used with either original equipment manufactured spacers in the wheel hub assembly, or after-market spacers. The resultant process achieves endplay which increases wheel hub assembly life, but results in a final torque applied to the retaining nut which is different than the manufacturer's specified torque.

In accordance with the invention, as shown in FIG. 3 to measure endplay, the endplay measuring tool 10 is affixed to the wheel hub assembly 20 and moved. In accordance with an aspect of the invention one such tool 10 is described herein. Tool 10 may include a frame 30 formed of a plurality of cross members. Frame 30 may be connected to a handle 40 at one end of tool 10. Frame 30 may also include legs 50 which may extend from frame 30 away from handle 40.

As shown in FIG. 3, the endplay measuring tool 10 may include a pair of torque sticks 42 and torque limiters 46. The torque sticks each contain a torque socket 44 recessed into, but moveable relative to feet 55. The torque sockets 44 include a threaded axial opening therein having a thread size which mates with lugs 60 so that the torque socket 44 may be threaded onto lug 60 of the wheel hub assembly. Also, each torque stick 42 includes a torque limiter 46. The torque limiter allows the torque stick 42 to be tightened when torque socket 44 is threaded onto lug 60, without exceeding a preset torque. One example of a torque limiter useable in the present invention and incorporated into a torque socket is disclosed in U.S. Patent Application Publication No. US2009/0255386 published on Oct. 15, 2009, the entirety of which is incorporated by reference. Accordingly, each torque stick 42 may be tightened using a lug wrench. When the torque exerted by the lug wrench onto the torque stick 42 exceeds a preselected amount, the torque limiter 46 does not allow such torque to he transmitted to torque socket 44. Accordingly, each torque socket 44 may be tightened not over a preselected torque, which torque is determined by the particular wheel hub assembly for use by the endplay measurement tool.

As shown in FIG. 3, the tool 10 is mounted onto wheel lug 60 by placing torque sockets 44 onto oppositely located wheel lugs 60 and threadably engaging each torque socket 44 onto its respective wheel lug 60 until torque limiters 46 allow the maximum preselected torque. The feet 55 of the tool 10 may be recessed on the underside so that the lugs of the wheel hub assembly which are not received within the torque sockets will enter the recess when the lugs received within the torque sockets are threaded within the torque socket. Each torque stick 42 contains a hex cap which is sized to be received within a lug wrench for tightening of the torque sticks 42. Once the endplay measuring tool 10 is fully tightened, endplay of the wheel hub assembly and bearings therein may be determined as described below. Detailed description of how the endplay measurement tool is used to measure endplay is discussed in U.S. patent application Ser. No. 13/400,227 tiled on Feb. 20, 2012, which is incorporated by reference herein in its entirety.

When a measurement of endplay of hub assembly 20, including wheel hub 12 and bearing 16, is desired, a user may grasp handle 40 and push in a first direction toward hub 12 until no further forward motion occurs. Probe assembly 90 may then be reset to a known setting (e.g., 'zeroed') to allow a measurement by probe assembly 90 which it is in contact with follower. The user may then pull in a second direction on handle 40 until no further reverse motion of hub 12 occurs. The user may then view a display on the probe 90 to determine a measurement of the movement of hub 12 relative to the follower as determined by the movement of probe 90 which is in contact with the face of the follower. The movement by the probe signals a distance on the display which indicates the endplay of wheel hub 12 and bearing 16. The difference between a movement after forward motion of the hub ceases to that after reverse motion of the hub ceases provides an indication of the endplay of bearing 16. The components of system 10 (e.g., the connecting legs, extending legs, handle, tabs, and frame) may be sufficiently rigid to allow the application of a force (e.g., in a forward and reverse axial direction relative to shaft 14) to handle 40 to transfer such force to hub 12 to allow the motion of hub 12 in a forward and reverse direction to allow the measurement of the endplay as described.

After the measurement of endplay described above (or prior thereto) it may be desirable to tighten or loosen nut 11 to adjust such endplay. As depicted in FIG. 3, openings may be present between connecting legs 50. A user may insert a wrench 34 to engage the wrench with a nut 11 to adjust an endplay of bearing 16 and hub 12.

The inventive method may be performed either with or without a wheel and tire 20 mounted thereon. In addition, the method may be performed any time when a wheel hub assembly is installed or replaced on an axle or spindle shaft. The method may be used on steer hubs, drive hubs, or trailer hubs of vehicles, in particular, trucks.

In accordance with the invention, the retaining nut is not locked at the manufacturer's specified torque setting. Rather, instead of locking the nut at such a specified torque, an endplay measurement tool is assembled onto the wheel hub assembly, as previously described herein and an endplay measurement is taken. The endplay measurement, preferred in accordance with the present invention, should be less than 0.005 inches and preferably 0.001 inches. Such an amount should result in maximum wheel bearing life. It is believed, that an endplay measurement of 0.005 inches will result in a wheel bearing life of approximately 60% of the life that would be achieved with an endplay measurement of 0.001 inches. Accordingly, an endplay measurement of less than 0.005 inches is desireable and an endplay of 0.001 inches is preferred. When the desired endplay setting is reached, preferably 0.001 inches, the retaining nut 11 may be licked in its position and the bearing setting procedure is completed.

Although aspects of the present invention were described above with respect to their application to wheel huh assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspect as fall within the true spirit and scope of the invention.

The invention claimed is:

1. A method of setting a wheel hub assembly having a spacer therein on a shaft, axle or spindle comprising:
   accessing a wheel hub assembly having a spacer and at least one bearing therein mounted on a shaft, axle or spindle;
   torquing a retaining nut on the wheel hub assembly to a specified torque for said wheel hub assembly, said torque specified by a manufacturer of said wheel hub assembly as a final desired torque, said retaining nut securing said assembly together, wherein a compressive load is applied to said spacer and said at least one bearing;

rotating a wheel hub of said wheel hub assembly to set said at least one bearing;

reducing the torque on said retaining nut after said rotating step to a torque less than said specified torque;

measuring endplay within said wheel hub assembly using an endplay measuring tool by applying a force to said tool to move said hub in a first axial direction until a cessation of movement of said hub at a first position, applying a force on said tool in a second axial direction opposite to said first axial direction until a second cessation of movement of said hub at a second position, determining a first measurement at said first position and a second measurement at said second position to measure relative movement between a structure of said tool and said shaft to determine said endplay of the bearing by comparing said first measurement to said second measurement; and adjusting the torque on said retaining nut to obtain a desired endplay measurement of said wheel hub assembly, wherein the resultant torque on said retaining nut at said desired endplay measurement is different from said specified torque for said wheel hub assembly.

2. The method of claim 1 wherein said desired endplay measurement is less than 0.005 inches.

3. The method of claim 2 wherein said desired endplay measurement is less than 0.004 inches.

4. The method of claim 3 wherein said desired endplay measurement is less than 0.003 inches.

5. The method of claim 4 wherein said desired endplay measurement is less than 0.002 inches.

6. The method of claim 5 wherein said desired endplay measurement is about 0.001 inches.

7. The method of claim 1 wherein said wheel hub assembly includes two bearings, said spacer being located therebetween.

8. The method of claim 1 wherein said wheel hub assembly includes an adjustable spacer.

9. The method of claim 1 wherein said resultant torque is greater than said specified torque.

10. The method of claim 1 wherein said resultant torque is less than said specified torque.

11. The method of claim 1 wherein a wheel is mounted on said wheel hub assembly and said endplay measuring tool is mounted over said wheel.

12. The method of claim 1 wherein said retaining nut comprises a lock nut, and further comprising locking said lock nut after said desired endplay measurement is achieved.

13. The method of claim 1 wherein said retaining nut is rotated to adjust the torque while said endplay measuring tool is connected to said wheel hub assembly.

14. The method of claim 13 wherein said endplay measuring tool is connected to wheel lugs of the wheel hub of said wheel hub assembly.

15. The method of claim 14 wherein said endplay measuring tool is manually operated.

16. The method of claim 14 wherein said spacer is different from an original equipment spacer manufactured for said bearing assembly.

17. The method of claim 1 wherein said retaining nut is rotated to adjust the torque while said endplay measuring tool is connected to said wheel hub assembly.

18. The method of claim 1 wherein said wheel hub assembly includes two bearings, said spacer being located therebetween.

19. A method of setting a wheel hub assembly having a spacer therein on an axle or spindle comprising:

accessing a wheel hub assembly having a spacer and at least one bearing therein mounted on an axle or spindle;

torquing a retaining nut on the wheel hub assembly to a specified torque for said wheel hub assembly, said torque specified by a manufacturer of said wheel hub assembly, said retaining nut securing said assembly together, wherein a compressive load is applied to said spacer and said at least one bearing;

rotating a wheel hub of said wheel hub assembly to set said at least one bearing;

reducing the torque on said retaining nut after said rotating step to a torque less than said specified torque;

measuring endplay within said wheel hub assembly using an endplay measuring tool by applying a force to a handle of said tool to move said hub in a first axial direction until a cessation of movement of said hub at a first position, applying a force on said handle in a second axial direction opposite to said first axial direction until a second cessation of movement of said hub at a second position, determining a first measurement of a probe at said first position and a second measurement of said probe at said second position to measure relative movement between a structure of said tool and said shaft to determine said endplay of the bearing by comparing said first measurement to said second measurement; and adjusting the torque on said retaining nut to obtain a desired endplay measurement of said wheel hub assembly, wherein the resultant torque on said retaining nut at said desired endplay measurement is different from said specified torque for said wheel hub assembly.

20. The method of claim 19 further comprising threadingly engaging torque sockets of said endplay measuring tool onto lugs of said hub of said hub assembly mounted on said shaft to connect the apparatus to said hub.

21. The method of claim 20 wherein said structure and said handle are sufficiently rigid to allow a user to tighten said torque sockets onto the lugs and apply said force to said handle to move said hub in the first axial direction relative to said shaft until said cessation of movement of said hub relative to said shaft, wherein said probe measures said movement to represent endplay.

* * * * *